United States Patent
Albertin

(10) Patent No.: US 10,942,286 B2
(45) Date of Patent: Mar. 9, 2021

(54) SYSTEM AND METHOD FOR IMAGE-DOMAIN FULL WAVEFORM INVERSION

(71) Applicant: CHEVRON U.S.A. INC., San Ramon, CA (US)

(72) Inventor: Uwe K. Albertin, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 316 days.

(21) Appl. No.: 16/111,309

(22) Filed: Aug. 24, 2018

(65) Prior Publication Data
US 2019/0064377 A1 Feb. 28, 2019

Related U.S. Application Data

(60) Provisional application No. 62/549,595, filed on Aug. 24, 2017.

(51) Int. Cl.
*G01V 1/30* (2006.01)
*G01V 1/28* (2006.01)
*G01V 1/36* (2006.01)

(52) U.S. Cl.
CPC .............. *G01V 1/303* (2013.01); *G01V 1/282* (2013.01); *G01V 1/368* (2013.01); *G01V 2210/42* (2013.01); *G01V 2210/67* (2013.01)

(58) Field of Classification Search
CPC .................................................... G01V 1/303
See application file for complete search history.

(56) References Cited

U.S. PATENT DOCUMENTS

| 2011/0090760 A1 | 4/2011 | Rickett et al. |
| 2012/0316791 A1 | 12/2012 | Shah et al. |
| 2014/0278299 A1* | 9/2014 | Hill ........................ G01V 1/303 703/2 |

OTHER PUBLICATIONS

Dettmer, J., et al., Tsunami source uncertainty estimation: The 2011 Japan tsunami, May 17, 2016, Journal of Geophysical Research: Solid Earth.
Hawkins, R., et al., Geophysical imaging using trans-dimensional trees, Geophysical J. Int. (2015). 203, 972-1000, GJI Seismology.
Hawkins, R., et a; Trans-dimensional Bayesian inversion of airborne electromagnetic data for 2D conductivity profiles, Exploration Geophysics, 2018, 49, 134-147, CSIRO Publishing.
Hossen, M.J., et al., Tsunami waveform inversion for sea surface displacement following the 2011 Tohoku earthquake: Importance of dispersion and source kinematics, Aug. 10, 2015, Journal of Geophysical Research: Solid Earth.
Sambridge, M., et al., Taming uncertainty in geophysical inversion, ASEG-PESA-AIG 2016, Adelade, Australia.

(Continued)

*Primary Examiner* — Manuel A Rivera Vargas
(74) *Attorney, Agent, or Firm* — Marie L. Clapp

(57) ABSTRACT

A method is described for image-domain full waveform inversion. The method may include receiving, at a computer processor, a seismic dataset representative of the subsurface volume of interest and an initial earth model; performing, via the computer processor, an image domain full waveform inversion to generate an updated earth model; and performing, via the computer processor, seismic imaging of the seismic dataset using the updated earth model to generate a seismic image. The method may be executed by a computer system.

6 Claims, 8 Drawing Sheets

(56) References Cited

OTHER PUBLICATIONS

Ray, A., et al., Frequency domain full waveform elastic inversion of marine seismic data from the Alba field using a Bayesian trans-dimensional algorithm, Geophysical Journal International, Feb. 10, 2016 GJI Marine geosciences and applied geophysics, Geophys. J. Int. (2016) 205, 915-937.

PCT International Search Report and Written Opinion, dated Nov. 29, 2018, issued in International Application No. PCT/IB2018/056433, filed on Aug. 24, 2018, 11 pages.

Sanzong Zhang et al., "Image-Domain Full Waveform Inversion", Society of Exploration Geophysicists, SEG-2013-1238, 2013 SEG Annual Meeting, Sep. 22-27, Houston, Texas, USA.

Sanzong Zhang et al., "Image-Domain Full Waveform Inversion: Field Data Example", Society of Exploration Geophysicists, SEG-2014-1441, 2014 SEG Annual Meeting, Oct. 26-31, Denver, Colorado, USA.

\* cited by examiner

X-Z slice of full image perturbation gradient, v=2000 m/s, dv=-40 m/s

X-Z slice of DSO gradient with adjoint derivative, adding in end bins using a zero derivative boundary condition, v=2000 m/s, dv=250 m/s X-Z slice of enhanced gather gradient using near trace stack minus gather residual input to the tomographic operator, vtrue=2000, dv=-250 m/s. This gradient is much closer in behavior to that in Fig 1 than the DSO gradient in Fig. 2, with significantly less edge artifacts.

X-Z slice of slow Gaussian anomaly, 2000 background model, dv=-150. peak. Black horizontal line is a reflector.

X-Z slice of full image perturbation gradient for the slow Gaussian anomaly.

X-Z slice of DSO gradient with adjoint derivative zero derivative boundary condition for the slow Gaussian anomaly. Horizontal reflector is poor.

Near trace stack minus gather EGDT gradient for the slow Gaussian anomaly.

Elliptical model.

X-Z slice of full image perturbation gradient for the elliptical model

X-Z slice of DSO gradient with adjoint derivative and zero derivative boundary condition for the elliptical velocity model.

X-Z slice of near trace stack minus gather EGDT gradient for the elliptical velocity model.

SYSTEM AND METHOD FOR IMAGE-DOMAIN FULL WAVEFORM INVERSION

CROSS-REFERENCE TO RELATED APPLICATIONS

The present application claims the priority benefit of U.S. Provisional Application Ser. No. 62/549,595, filed on Aug. 24, 2017, which is incorporated herein by reference in its entirety.

STATEMENT REGARDING FEDERALLY SPONSORED RESEARCH OR DEVELOPMENT

Not applicable.

TECHNICAL FIELD

The disclosed embodiments relate generally to techniques for estimating velocity in subsurface reservoirs based on seismic data and, in particular, to a method of estimating velocity in the subsurface using full waveform inversion of the seismic data for the purpose of generating seismic images to be used in hydrocarbon exploration and production.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. This processing includes determining the subsurface rock properties, such as the seismic velocities throughout the subsurface. Determining the subsurface rock properties allows seismic imaging that produces interpretable images so that rock and fluid property changes can be identified. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved seismic velocity estimation to generate improved seismic images that will allow better seismic interpretation of potential hydrocarbon reservoirs.

SUMMARY

In accordance with some embodiments, a method of image domain full waveform inversion is disclosed, the method including receiving, at a computer processor, a seismic dataset representative of the subsurface volume of interest and an initial earth model; performing, via the computer processor, an image domain full waveform inversion to generate an updated earth model; and performing, via the computer processor, seismic imaging of the seismic dataset using the updated earth model to generate a seismic image.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
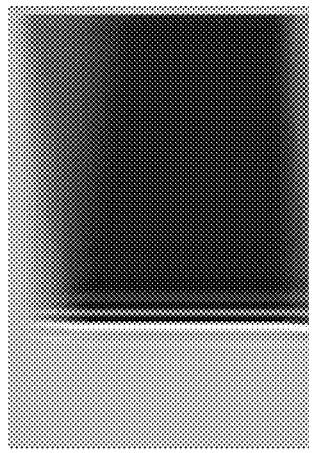
FIG. 1 is the Full image perturbation gradient for a constant velocity model.

Described below are methods, systems, and computer readable storage media that provide a manner of seismic imaging. These embodiments are designed to be of particular use for seismic imaging of subsurface volumes in geologically complex areas.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Advantageously, those of ordinary skill in the art will appreciate, for example, that the embodiments provided herein may be utilized to generate a more accurate digital seismic image (i.e., the corrected digital seismic image). The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

The present invention includes embodiments of a method and system for full waveform inversion. The method begins by receiving a seismic dataset. As previously described, the seismic dataset includes a plurality of traces recorded at a plurality of seismic sensors. This dataset may have already been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data before it is deemed ready for full waveform inversion (FWI) and imaging.

The seismic dataset is used as input for the image-domain FWI disclosed as follows:

Definitions

𝓕 —full modeling operator

F—derivative of the full modeling operator=Born operator. This is assumed to operate on the extended space if the operand is in the extended space.

F$\delta\overline{m}$—Born operator applied to the model perturbation $\delta\overline{m}$ $\delta m$—model perturbation in the non-extended domain (image stack)

$\delta\overline{m}$—model perturbation in the extended domain (image gather)

$\delta m_l$—long wavelength model perturbation (not extended)

d—data $\delta d$—data perturbation=band limited data

DF[$\delta m, \delta m'$]—derivative of the Born operator applied to the model perturbations $\delta m$ $\delta m'$ DF*[$\delta m, d$]—tomographic operator=derivative of adjoint of the Born operator applied to $\delta m$, d The standard conventional tomographic FWI objective function is given by $$J = \left(\frac{1}{2}\right)\left|F\delta\overline{m} - \delta d\right| + \left(\frac{1}{2}\right)\lambda^2\left|A\delta\overline{m}\right|^2 \quad (1)$$

The normal equations from this objective function for $\delta\overline{m}$ are (F*F+$\lambda^2$A*A)$\delta\overline{m}$=F*$\delta d$ The standard procedure to solve this problem using variable projection is to approximately solve the normal equation for $\delta\overline{m}$ to some tolerance with a linear solver, and then evaluate the gradient of J with respect to the long wavelength part of the model $m_l$ using this value of $\delta\overline{m}$. This conventional procedure tends to be costly because of the iterations required in the linear solver which are required at every stage of the nonlinear solve for $m_l$. The present invention implements a method that can avoid this linear solution and significantly reduce the computational cost.

The normal equations can be formally solved as $$\delta\overline{m} = (F^*F + \lambda^2 A^*A)^{-1}F^*\delta d = (F^*F)^{-1}(1 + \lambda^2 A^*A(F^*F)^{-1})^{-1}F^*\delta d \approx$$
$$(F^*F)^{-1}(1 - \lambda^2 A^*A(F^*F)^{-1})F^*\delta d$$

which are approximately satisfied if $\lambda$ is made sufficiently small. Writing the result for the image perturbation in this way makes clear that the overall effect of the annihilator in $\delta\overline{m}$ is to enhance the gather because of the minus sign in the second term on the right; energy in a gather corresponding to the correct model lies in the kernel of the annihilator, and so is removed from the gather. Subtracting this result from the original gather produces a gather that corresponds to a more correct model. Instead of solving this equation iteratively, an embodiment of the present invention can replace it with the approximate equation $$\delta\overline{m} \approx (F^*F)^{-1}EF^*\delta d \quad (2)$$

where E is a suitable enhancing operator. This expression can be generalized to use a generic enhancing operator E that satisfies E$\delta\overline{m}$=$\delta\overline{m}$ when the model is correct, and is not necessarily linked to the original annihilator A.

Define an image-domain objective function according to $$J = \left(\frac{1}{2}\right)\left|F^*(F\delta\overline{m} - \delta d)\right|^2 + \lambda^2\left|FA\delta\overline{m}\right|^2 \quad (3)$$

It can be verified that this objective function has the same normal equations as the original tomographic FWI objective function under the assumption that the annihilator approximately commutes with the normal operator. Hence the normal equations can be solved for $\delta\overline{m}$ approximately as above. Neglecting the second term here for small $\lambda$, and neglecting the derivative of the normal operator with respect to the background model gives a gradient $$\nabla_{m_l}J = DF^*[F^*F\delta\overline{m} - F^*\delta d, -\delta d] \quad (4)$$

The present invention may be implemented with either of the two following embodiments:

Algorithm 1: Simple enhanced gather difference tomography (EGDT)

This method covers a wide class of gathers, including surface offset, common-angle, shot-offset, and plane wave gathers. It also covers a broad range of enhancing operators, such as optimal stacking and image warping. Substituting the form for $\delta\overline{m}$ into the objective function (3) neglecting the second term leads to $$J = \left(\frac{1}{2}\right)\left|(E-1)F^*\delta d\right|^2 \quad (5)$$

While substitution of the form for $\delta\overline{m}$ into the approximate gradient expression (4) gives $$\nabla_{m_l}J = DF^*[(E-1)F^*\delta d, -\delta d] \quad (6)$$

Note that this approximate gradient is not directly derivable from the approximate objective function (5) because of the approximations made in arriving at equation (4). In fact, direct derivation of the gradient of (5) leads to $$\nabla_{m_l}J = DF^*[(E^*-1)(E-1)F^*\delta d, -\delta d] \quad (7)$$

The expression in (6) is approximate. However, use of this expression solves phase and instability issues associated with standard DSO methods of wave-equation migration velocity updating, as will be seen in the examples below. Note that the approximate gradient in (6) does vanish when the model is correct, a necessary condition for the gradient to find a minimum of the objective function.

Use of equations (5) and (6) leads to the following algorithm:
1. Migrate the data to an extended gather domain
2. Form an enhanced gather image from the image gather, and then subtract this image from the original image
3. Use this result along with minus the data to evaluate the tomographic operator and derive the gradient.

For the case of surface offset gathers coming out of RTM, a simple enhancing operator can be used that amounts to creating a pilot trace from near offsets, duplicating the pilot trace across the gather, and then creating the residual by subtracting the original image gather from this gather.

Figure 2:
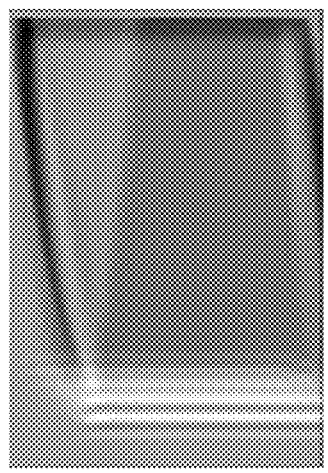
FIG. 2 is the DSO gradient with adjoint derivative, using a zero derivative boundary condition for a constant velocity model.
Figure 3:
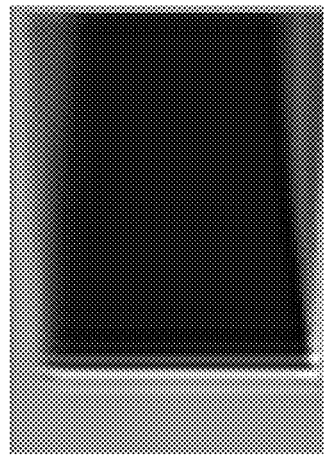
FIG. 3 is the enhanced gather gradient using near trace stack minus gather residual input to the tomographic operator (enhanced gather difference tomography (EGDT) gradient) for a constant velocity model.
Figure 4:
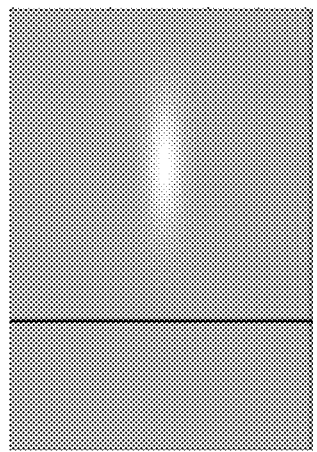
FIG. 4 is a slow Gaussian anomaly.
Figure 5:
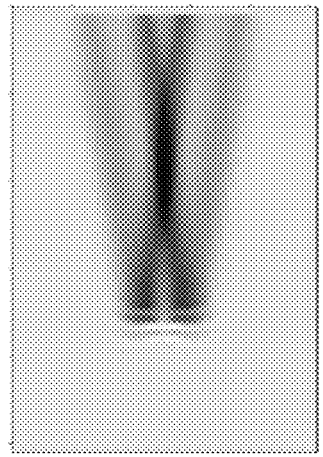
FIG. 5 is the full image perturbation gradient for the velocity model with a slow Gaussian anomaly.
Figure 6:
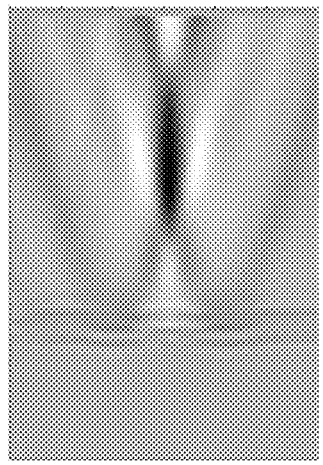
FIG. 6 is the DSO gradient for the velocity model with a slow Gaussian anomaly.
Figure 7:
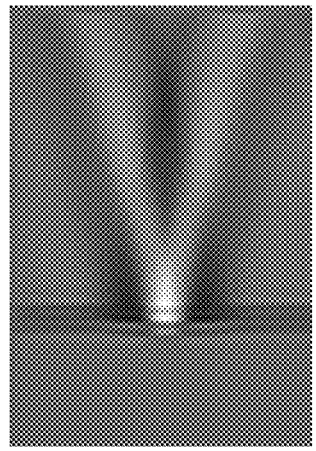
FIG. 7 is the near trace stack minus gather EGDT gradient for the velocity model with a slow Gaussian anomaly.
Figure 8:
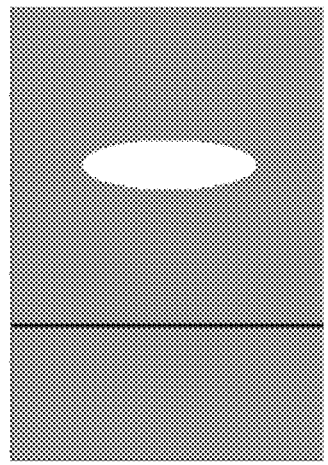
FIG. 8 is an elliptical-anomaly velocity model.
Figure 9:
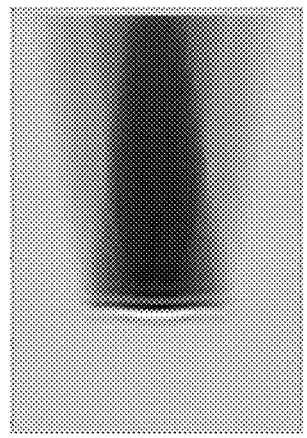
FIG. 9 is the full image perturbation gradient for the elliptical-anomaly velocity model.
Figure 10:
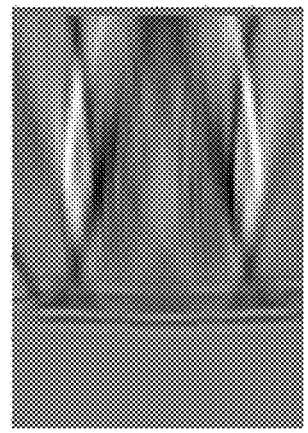
FIG. 10 is the DSO gradient for the elliptical-anomaly velocity model.
Figure 11:
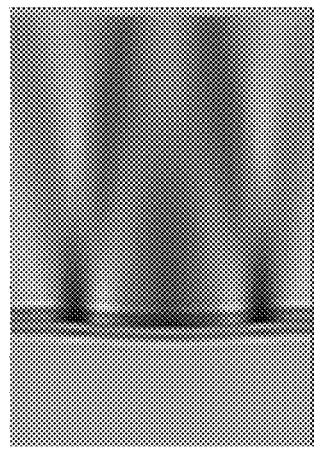
FIG. 11 is the near-trace stack minus gather EGDT gradient for the elliptical-anomaly velocity model.

Examples are shown in the figures. FIG. 1 shows the gradient from a full image perturbation, which may be used as a reference for the optimal backprojection for a single reflector case with a constant velocity perturbation error. FIG. 2 shows a standard DSO wave equation migration velocity analysis (WEMVA) result, while FIG. 3 shows the EGDT result using eqn. 6, which shows fewer edge artifacts than standard DSO. EGDT also performs slightly better for a hard boundary elliptical model (FIG. 8, with its full image perturbation gradient in FIG. 9), seen when comparing FIG. 10 (standard DSO) and FIG. 11 (EGDT). It does not perform quite as well as DSO WEMVA on a Gaussian anomaly (FIG. 4, with its full image perturbation gradient in FIG. 5), seen in FIGS. 6 and 7.

Algorithm 2: Illumination-compensated enhanced gather difference tomography (ICEGDT)

Define an amplitude spectrum matching operator M such that $$\mathrm{amp}(MF^*FEF^*\delta d) = \mathrm{amp}(F^*\delta d)$$

Ideally the operator M should match amplitudes but not affect kinematics, so that it approximately achieves what the normal operator would otherwise achieve. Define a second operator $M_0$ and set $\delta\overline{m} = M_0 F^* \delta d$ where $M_0$ satisfies $$MF^*FEF^*\delta d = F^*FEM_0 F^*\delta d$$

Substituting this expression for $\delta\overline{m}$ into the gradient in eqn. (4) gives $$\nabla_{m_l} J =$$
$$DF^*[F^*FEM_0 F^*\delta d - F^*\delta d, -\delta d] = DF^*[MF^*FEF^*\delta d - F^*\delta d, -\delta d]$$

from which the residual fed into the tomographic operator is $$r = MF^*FEF^*\delta d - F^*\delta d$$

This leads to algorithm 2:
1. Migrate to an extended gather domain to produce a gather $F^*\delta d$
2. Form the enhanced gather by applying E
3. Demigrate and remigrate the enhanced gather
4. Apply a spectral amplitude matching filter to match amplitudes between the resulting gather and the original gather and subtract to form the residual
5. Apply the tomographic operator to get the gradient This algorithm automatically compensates for moveout (and amplitudes) on the gather that are related to illumination because of the demigration/remigration cycle applied to the enhanced gather.

Figure 12A:
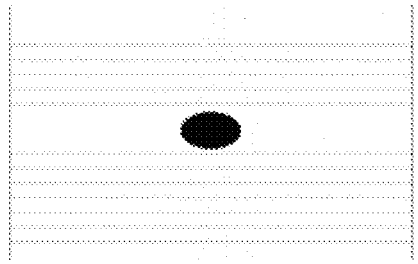
FIG. 12A is a velocity model.
Figure 12B:
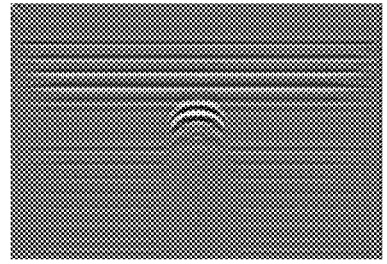
FIG. 12B is a limited bandwidth standard RTM image without illumination compensation.
Figure 12C:
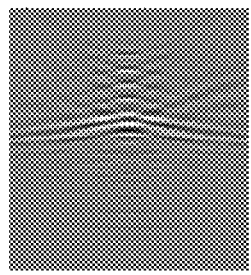
FIG. 12C is a subsurface offset gather from the center of the model.
Figure 12D:
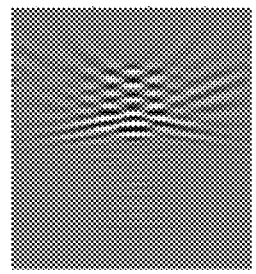
FIG. 12D is the result of demigrating the stacked image and remigrating to a subsurface offset gather in the background model.
Figure 12E:
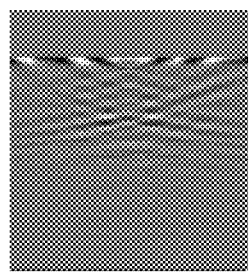
FIG. 12E is the residual for the tomographic operator.
Figure 12F:
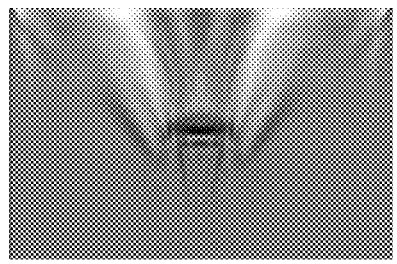
FIG. 12F is a gradient without any regularization.
Figure 12G:
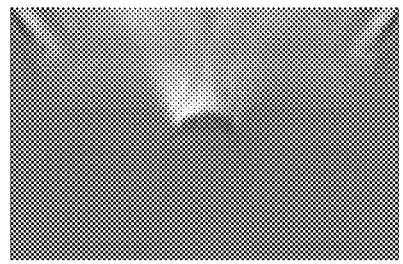
FIG. 12G is a gradient using the residual for the tomographic operator.

In summary, two possible embodiments for the present invention include:

A method for producing long-wavelength model parameter updates in acoustic or elastic media consisting of a nonlinear optimization where each step of the optimization consists of
  1. An initial imaging step to create gathers or a model perturbation $\delta\overline{m}$ in an extended model domain.
  2. Enhancement of the gather with an operator E to make the gather more consistent with a correct model
  3. Creation of a residual $(E-1)\delta\overline{m}$ by subtracting the original gather from the enhanced gather.
  4. Backprojection of the residual in a tomographic FWI operation to obtain a long wavelength background model parameter gradient
  5. Update of the model using a suitable nonlinear solver A method for producing long-wavelength model parameter updates in acoustic or elastic media consisting of a nonlinear optimization where each step of the optimization consists of
  1. An initial imaging step to create gathers or a model perturbation $\delta\overline{m}$ in an extended model domain.
  2. Enhancement of the model perturbation gather with an operator E to make the gather more consistent with a correct model, followed by demigration and remigration $F^*F$ of the enhanced gather and spectral amplitude matching M to the initial gather
  3. Creation of a residual $MF^*FE\delta\overline{m} - \delta\overline{m}$ by subtracting the original gather from the demigrated/remigrated gather after amplitude matching
  4. Backprojection of the residual in a tomographic FWI operation to obtain a long wavelength background model parameter gradient
  5. Update of the model parameter using a suitable nonlinear solver FIGS. 12A-12G illustrate tomographic image-domain FWI for a subsurface including salt. FIG. 12A shows the correct model, with a 5000 m/s salt body, and 2000 m/s sediments including reflectors above and below the salt. FIG. 12B shows a limited bandwidth standard RTM image without illumination compensation using a background model of 2000 m/s. The base salt cannot be seen; all events below salt are intrasalt multiples. FIG. 12C shows a subsurface offset gather from the center of the model. Even though the model is correct, the strongest event is the top salt event, which is not well focused at all due to the contrast and bandwidth limits. FIG. 12D shows the result of demigrating the stacked image and remigrating to a subsurface offset gather in the background model. The residual for the tomographic operator was then obtained by spectral balancing and amplitude matching the gather in FIG. 12C to that in FIG. 12D and subtracting to give the gather in FIG. 12E. This residual should be more representative of velocity error, with the strong top salt being significantly attenuated. FIG. 12F shows a standard DSO WEMVA gradient for this data without any regularization, showing significant edge and intrasalt artifacts from the multiples. FIG. 12G shows the gradient using the residual constructed in FIG. 12E. Many of the WEMVA artifacts are now gone, and the salt can be seen as its proper crescent shape, which is consistent with an update from a base salt event that is severely mispositioned.

When interpreting a seismic image, seismic horizons are identified and traced throughout the subsurface volume of interest. Oftentimes, this volume of interest is near or below salt bodies because salt provides a good trap for potential hydrocarbon reservoirs. Improving the resolutions of events near or below salt allows better interpretation. This may impact hydrocarbon reservoir delineation and well planning.

Figure 13:
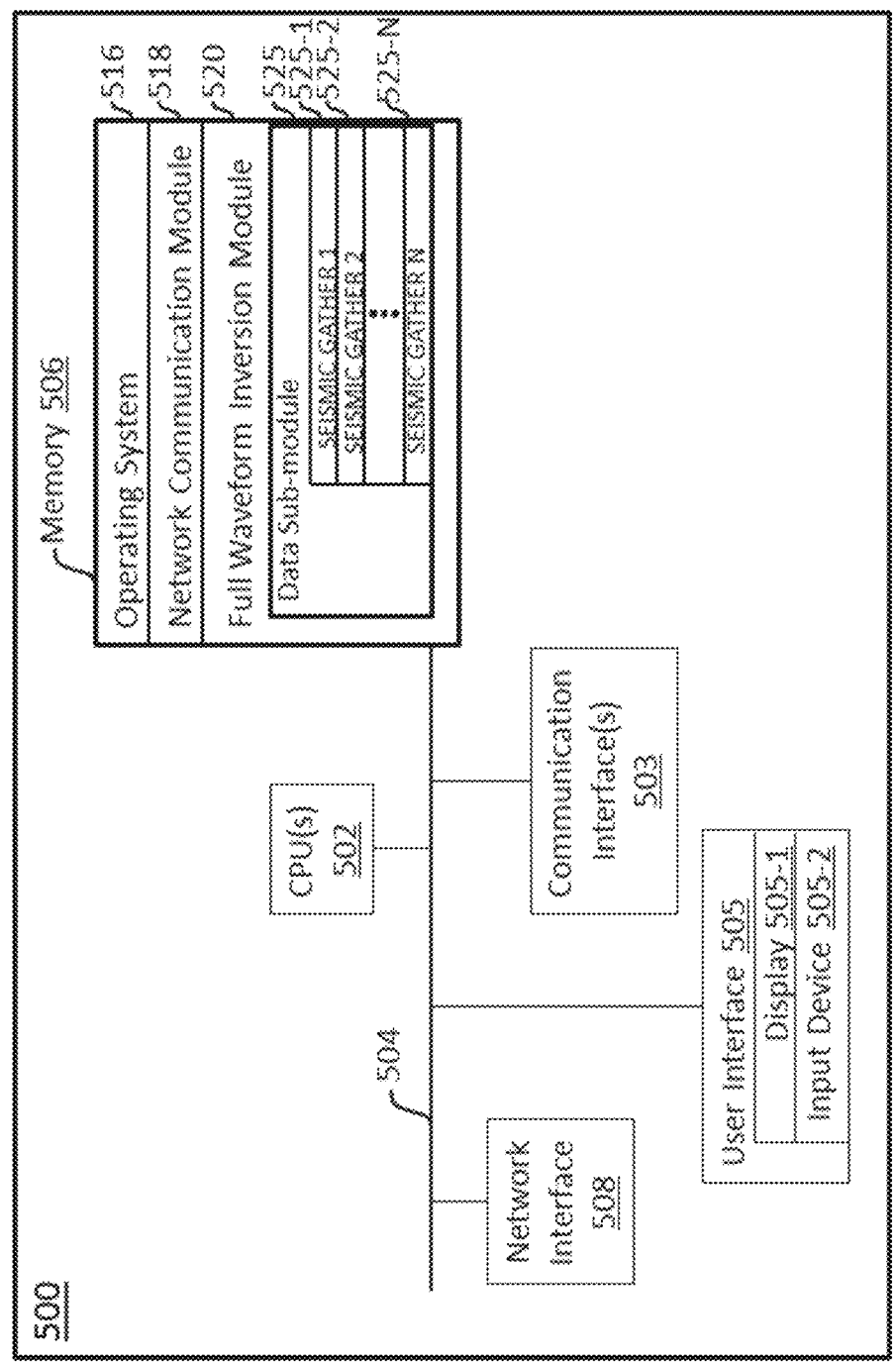
FIG. 13 is a block diagram illustrating a full waveform inversion system, in accordance with some embodiments.

FIG. 13 is a block diagram illustrating a full waveform inversion system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the full waveform inversion system 500 includes one or more processing units (CPUs) 502, one or more network interfaces 508 and/or other communications interfaces 503, memory 506, and one or more communication buses 504 for interconnecting these and various other components. The full waveform inversion system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a full waveform inversion module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the full waveform inversion module 520 executes the operations described above. Full waveform inversion module 520 may include data sub-module 525, which handles the seismic dataset including seismic gathers 525-1 through 525-N. This seismic data is supplied by data sub-module 525 to other sub-modules.

Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 19) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   a. receiving, at a computer processor, a seismic dataset representative of a subsurface volume of interest and an initial earth model;
   b. performing, via the computer processor, an image domain full waveform inversion including backprojection to generate an updated earth model; wherein the image domain full waveform inversion comprises:
      i. performing an initial imaging step to create at least one gather of a model perturbation $\overline{\delta m}$ in an extended model domain;

ii. enhancing the at least one gathers with an operator E to generate at least one enhanced gather that is more consistent with a correct model;
iii. creating a residual $(E-1)\overline{\delta m}$ by subtracting the at least one gather from the at least one enhanced gather;
iv. backprojecting the residual in a tomographic FWI operation to obtain a long wavelength background model parameter gradient; and
v. updating the initial earth model using a nonlinear solver and the long wavelength background model parameter gradient to generate the updated earth model; and c. performing, via the computer processor, seismic imaging of the seismic dataset using the updated earth model to generate a seismic image.

2. A computer-implemented method, comprising:
a. receiving, at a computer processor, a seismic dataset representative of a subsurface volume of interest and an initial earth model;
b. performing, via the computer processor, an image domain full waveform inversion including backprojection to generate an updated earth model; wherein the image domain full waveform inversion comprises:
i. performing an initial imaging step to create at least one gather of a model perturbation $\overline{\delta m}$ in an extended model domain;
ii. enhancing the at least one gather with an operator E to make the model perturbation gathers more consistent with a correct model to generate at least one enhanced gather;
iii. demigrating and remigrating the at least one enhanced gather to generate at least one new migrated gather;
iv. spectral amplitude matching M of the at least one new migrated gather to the at least one gather;
v. creating a residual $MF^*FE\overline{\delta m}-\overline{\delta m}$ by subtracting the at least one gather from the at least one new migrated gather;
vi. backprojecting the residual in a tomographic FWI operation to obtain a long wavelength background model parameter gradient; and
vii. updating the initial earth model using a nonlinear solver and the long wavelength background model parameter gradient to generate the updated earth model; and c. performing, via the computer processor, seismic imaging of the seismic dataset using the updated earth model to generate a seismic image.

3. The method of claims 1 or 2 wherein the initial earth model and updated earth model include one or more of primary wave velocity, shear wave velocity, and density.

4. A computer system for seismic imaging, comprising:
one or more processors;
memory; and
one or more programs, wherein the one or more programs are stored in the memory and configured to be executed by the one or more processors, the one or more programs including instructions that when executed by the one or more processors cause the device to execute the method of claims 1 or 2.

5. A non-transitory computer readable storage medium storing one or more programs, the one or more programs comprising instructions, which when executed by an electronic device with one or more processors and memory, cause the device to execute the method of claims 1 or 2.

6. The method of claims 1 or 2 further comprising using the seismic image to locate a hydrocarbon reservoir and extract hydrocarbons from the hydrocarbon reservoir.

* * * * *